(12) United States Patent
Abraham et al.

(10) Patent No.: US 6,958,726 B1
(45) Date of Patent: Oct. 25, 2005

(54) METHOD AND APPARATUS FOR ADJUSTING ACQUISITION ASSISTANCE DATA RECEIVED BY A MOBILE RECEIVER FROM A SERVER

(75) Inventors: Charles Abraham, Los Gatos, CA (US); Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 10/823,511

(22) Filed: Apr. 13, 2004

(51) Int. Cl.[7] ............................................. H04B 7/185
(52) U.S. Cl. .............................. 342/357.15; 342/357.01
(58) Field of Search ..................... 342/352, 357.01, 342/357.06, 357.15; 701/207, 213, 214

(56) References Cited

U.S. PATENT DOCUMENTS

| | | | | |
|---|---|---|---|---|
| 6,133,873 A | * | 10/2000 | Krasner | 342/357.12 |
| 6,211,819 B1 | * | 4/2001 | King et al. | 342/357.09 |
| 6,417,801 B1 | * | 7/2002 | van Diggelen | 342/357.08 |
| 6,429,811 B1 | * | 8/2002 | Zhao et al. | 342/357.09 |

\* cited by examiner

*Primary Examiner*—Dao Phan
(74) *Attorney, Agent, or Firm*—Moser, Patterson & Sheridan LLP (57) ABSTRACT

Method and apparatus for adjusting acquisition assistance data received by a mobile receiver from a server is described. In one example, pseudoranges are measured from the mobile receiver to a set of satellites. Line-of-sight data is obtained with respect to the mobile receiver and the set of satellites. The pseudoranges and the line-of-sight data are processed to compute updates for an initial position associated with the acquisition assistance data and a correlator clock bias associated with the pseudoranges. The acquisition assistance data is then adjusted using the updates and the line-of-sight data.

24 Claims, 6 Drawing Sheets

METHOD AND APPARATUS FOR ADJUSTING ACQUISITION ASSISTANCE DATA RECEIVED BY A MOBILE RECEIVER FROM A SERVER

BACKGROUND OF THE INVENTION

1. Field of the Invention

The present invention generally relates to satellite position location systems and, more particularly, to adjusting acquisition assistance data received by a mobile receiver from a server.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is, in practice, very difficult to calibrate the common mode error. As such, traditional GPS receivers treat the common mode error as an unknown that must be solved for, along with position, once a sufficient number of pseudoranges have been measured at a particular receiver.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote receiver has become known as "Assisted-GPS" or A-GPS.

One type of assistance data that may be provided to a GPS receiver is referred to in the art as "acquisition assistance data." The acquisition assistance data is configured to aid the GPS receiver in acquiring satellite signals. The acquisition assistance data typically includes estimated range data (i.e., estimated pseudorange or code phase) and estimated range derivative data from satellites to the GPS receiver. The acquisition assistance data is valid for an assumed position of the GPS receiver at an assumed time-of-day. An exemplary format for acquisition assistance data for use within location services of a global system for mobile communications (GSM) network is described in ETSI TS 101 527 (referred to as GSM 4.31), which is incorporated by reference herein in its entirety. Typically, the assumed position of the GPS receiver is known only at the server providing the acquisition assistance data, and not at the GPS receiver itself.

In addition, acquisition assistance data typically includes a range of uncertainty for one or more of the parameters contained therein. Notably, acquisition assistance data compliant with GSM 4.31 may include a code phase search window that provides a range of uncertainty associated with the expected code phase. The uncertainty results from the inaccuracy of the estimated position of the GPS receiver used by the server to generate the acquisition assistance data. When searching for satellite signals, the GPS receiver must search over the code phase search window to ensure acquisition. Wider uncertainty ranges result in longer acquisition times at the GPS receiver.

Accordingly, there exists a need in the art for a method and apparatus that adjusts acquisition assistance data received by a mobile receiver from a server to reduce satellite signal acquisition time.

SUMMARY OF THE INVENTION

Method and apparatus for adjusting acquisition assistance data received by a mobile receiver from a server is described. In one embodiment, pseudoranges are measured from the mobile receiver to a set of satellites. Line-of-sight data is obtained with respect to the mobile receiver and the set of satellites. The pseudoranges and the line-of-sight data are processed to compute updates for an initial position associated with the acquisition assistance data and a correlator clock bias associated with the pseudoranges. The acquisition assistance data is then adjusted using the updates and the line-of-sight data. In one embodiment, at least one additional pseudorange is measured using the adjusted acquisition assistance data. To measure the additional pseudorange(s), satellite signals may be processed using a different sample spacing than used when measuring the pseudoranges to the first set of satellites. For example, a narrower sample spacing may be employed (i.e., the signals may be processed at a higher resolution) when computing the additional pseudorange(s) using the adjusted acquisition assistance data. Position may be computed using all of the measured pseudoranges either by the mobile receiver, or by the server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
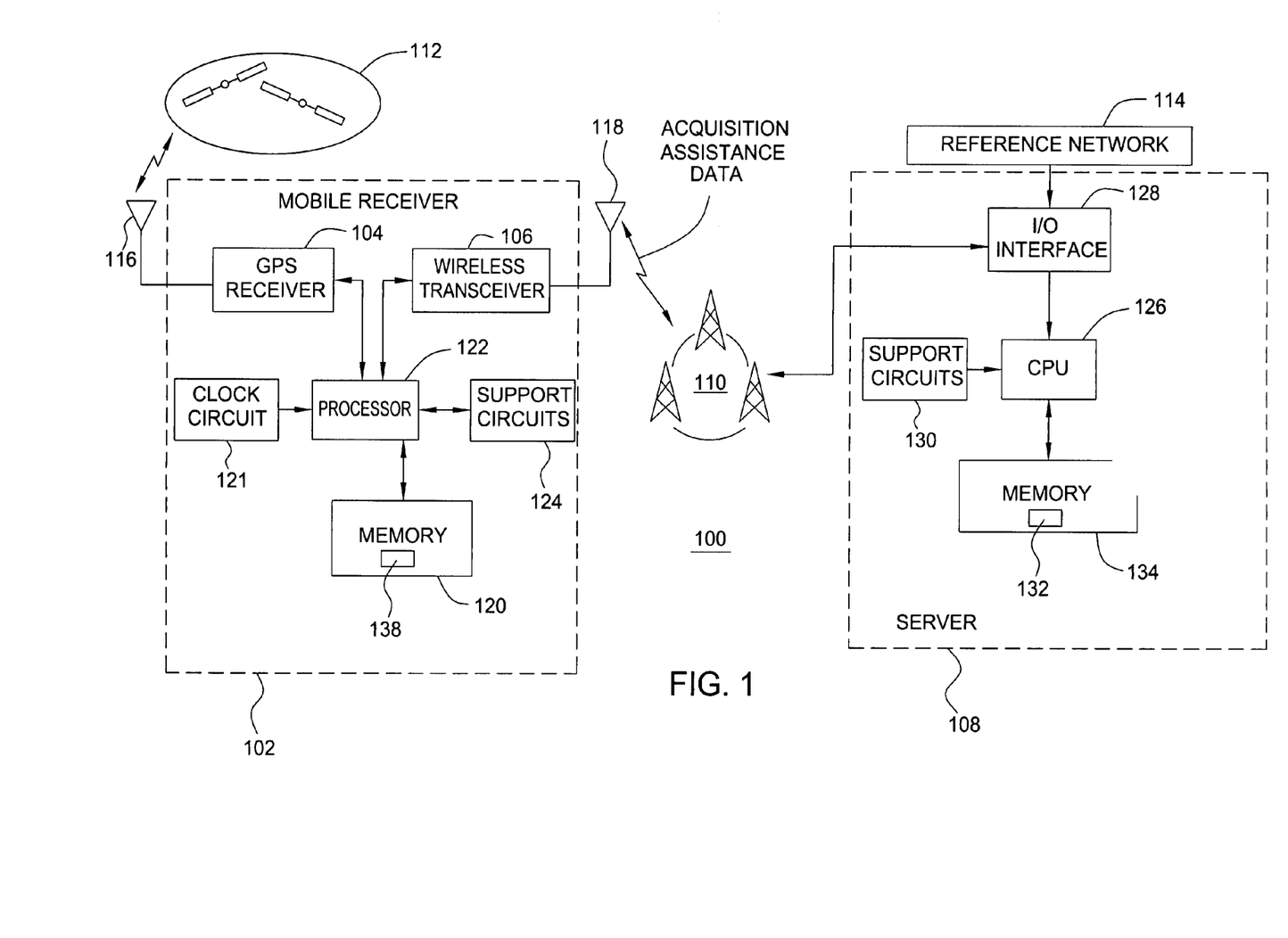
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. For example, the server 108 may be disposed in a serving mobile location center (SMLC) of the wireless communication network 110. The mobile receiver 102 obtains satellite measurement data with respect to a plurality of satellites 112 (e.g., pseudoranges, Doppler measurements). The server 108 obtains satellite navigation data for at least the satellites 112 (e.g., orbit trajectory information, such as ephemeris). Position information for the mobile receiver 102 is computed using the satellite measurement data and the satellite navigation data.

In one embodiment, the mobile receiver 102 sends the satellite measurement data to the server 108 along with a time-tag, and the server 108 locates position of the mobile receiver 102 (referred to as the mobile station assisted or "MS-assisted" configuration). In another embodiment, the server 108 sends the satellite navigation data to the mobile receiver 102, and the mobile receiver 102 locates its own position (referred to as the mobile station based or "MS-based" configuration). In either configuration, the server 108 is configured to transmit satellite signal acquisition assistance data ("acquisition assistance data") to the mobile receiver 102 upon request. The acquisition assistance data may be used to assist the mobile receiver 102 in acquiring satellite signals to obtain satellite measurement data. Various types of acquisition assistance data are described below.

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. The processes and methods described herein may be implemented using software 132 stored in the memory 134 for execution by the CPU 126. Alternatively, the server 108 may implement such processes and methods in hardware or a combination of software and hardware, including any number of processors independently executing various programs and dedicated hardware, such as application specific integrated circuits (ASICs), field programmable gate arrays (FPGAs), and the like.

The I/O interface 128 is configured to receive data, such as satellite measurement data collected by the mobile receiver 102, from the wireless network 110. In addition, the I/O interface 128 is configured to receive satellite navigation data, such as ephemeris for at least the satellites 112, from an external source, such as a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The server 108 uses the collected satellite navigation data to compute acquisition assistance data for the mobile receiver 102.

In one embodiment of the invention, the acquisition assistance data includes estimated range and range-derivative data from the satellites 112 to an assumed position of the mobile receiver 102 ("initial position") at an assumed time-of-day ("initial time-of-day"). For example, the acquisition assistance data may include one or more of expected pseudorange data (also referred to as expected code phase data), expected pseudorange rate data (i.e., 0th order Doppler data), expected pseudorange acceleration data (i.e., 1st order Doppler data). The acquisition assistance data may also include uncertainty data for the estimated range and range-derivative data. For example, the acquisition assistance data may include a code phase search window associated with each expected pseudorange. The acquisition assistance data may also include a Doppler search window associated with each expected pseudorange rate. In one embodiment, the acquisition assistance data may further include expected line-of-sight data, such as satellite azimuth and elevation angles that define expected line-of-sight vectors from the initial position to the satellites 112.

For example, the acquisition assistance data may include a model of estimated range and range-derivative data that is valid for a specified period of time ("pseudorange model"). The pseudorange model may be formed by the server 108 using an initial position for the mobile receiver 102. The mobile receiver 102 may apply a time-of-day to the pseudorange model to extract expected range and range rate parameters. Exemplary processes for forming pseudorange models as acquisition assistance data are described in commonly-assigned U.S. Pat. No. 6,453,237, issued Sep. 17, 2002, which is incorporated by reference herein in its entirety.

In another example, the acquisition assistance data may be formatted as described in the GSM 4.31 specification, which is shown below in Table 1. Notably, the acquisition assistance data defined in GSM 4.31 may include a satellite vehicle identifier (SVID), zeroth and first order Doppler terms, a Doppler uncertainty, a code phase (i.e., an expected pseudorange), an integer code phase, a code phase search window, and expected azimuth and elevation data. The range of possible values and associated resolutions are shown for each of the parameters.

TABLE 1

| Parameter | Range | Resolution |
| --- | --- | --- |
| SVID/PRNID | 1–64 (0–63) | n/a |
| Doppler (0$^{th}$ order term) | −5,120 Hz to 5,117.5 Hz | 2.5 Hz |
| Doppler (1$^{st}$ order term) | −1–0.5 | n/a |
| Doppler Uncertainty | 12.5 Hz–200 Hz [2$^{-n}$(200) Hz, n = 0–4] | n/a |
| Code Phase | 0–1022 chips | 1 chip |
| Integer Code Phase | 0–19 | 1 C/A period |
| GPS Bit number | 0–3 | n/a |
| Code Phase Search Window | 1–192 chips | n/a |
| Azimuth | 0–348.75 deg | 11.25 deg |
| Elevation | 0–78.75 deg | 11.25 deg |

The server 102 may obtain an initial position of the mobile receiver 102 using various position estimation techniques known in the art, including use of transitions between base stations of the wireless communication network 110, use of a last known location of the mobile receiver 102, use of a location of a base station in communication with the mobile receiver 102, use of a location of the wireless communication network 110 as identified by a network ID, or use of a location of a cell site of the wireless communication network 110 in which the mobile receiver 102 is operating as identified by a cell ID.

The mobile receiver 102 illustratively comprises a GPS receiver 104, a wireless transceiver 106, a processor 122, support circuits 124, a memory 120, and a clock circuit 121. The GPS receiver 104 receives satellite signals from the satellites 112 using an antenna 116. An exemplary embodiment of the GPS receiver 104 is described below with respect to FIG. 2. The wireless transceiver 106 receives a wireless signal from the wireless communication network 110 via an antenna 118. The GPS receiver 104 and the wireless transceiver 106 may be controlled by the processor 122. The clock circuit 121 may be used to track time-of-day and may comprise, for example, a real-time clock.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The support circuits 124 include conventional cache, power supplies, clock circuits, data registers, I/O interfaces, and the like to facilitate operation of the mobile receiver 102. The processes and methods described herein may be implemented using software 138 stored in the memory 120 for execution by the processor 122. Alternatively, the mobile receiver 102 may implement such processes and methods in hardware or a combination of software and hardware, including any number of processors independently executing various programs and dedicated hardware, such as ASICs, FPGAs, and the like.

Figure 2:
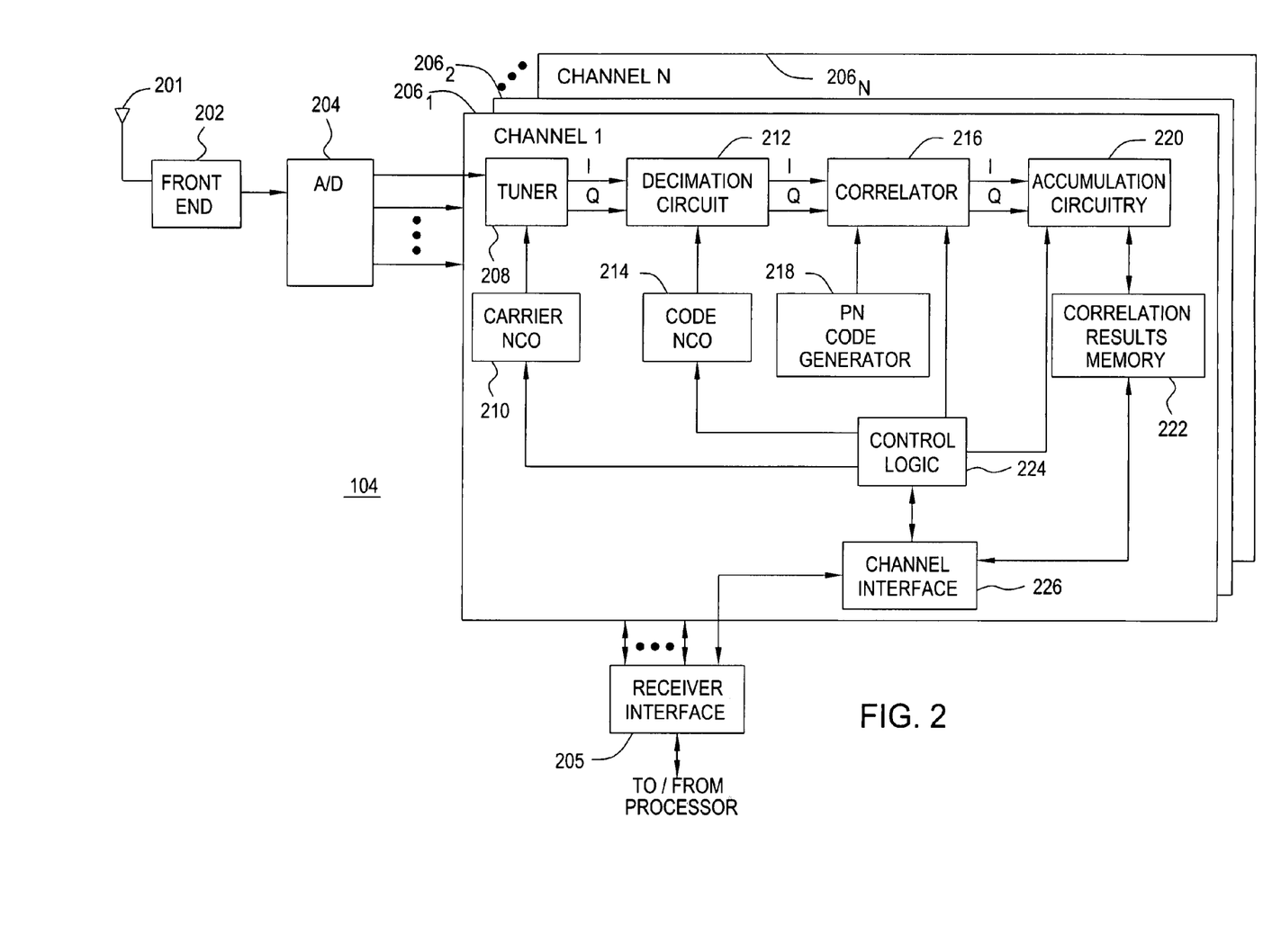
FIG. 2 is a block diagram depicting an exemplary embodiment of the GPS receiver of FIG. 1.

FIG. 2 is a block diagram depicting an exemplary embodiment of the GPS receiver 104 of FIG. 1. The GPS receiver 104 illustratively comprises a front end 202, an analog-to-digital converter 204, a receiver interface 205, and a set of processing channels $206_1$ through $206_N$ (collectively referred to as processing channels 206), where N is an integer. For purposes of clarity by example, only the processing channel $206_1$ is shown in detail. Those skilled in the art will appreciate that the processing channels $206_2$ through $206_N$ are identical to the processing channel $206_1$.

GPS signals are received by an antenna 201. The front end 202 filters, amplifies, and frequency shifts the GPS signals in a well-known manner for digitization by the A/D converter 204. Outputs of the A/D converter 204 are respectively coupled to each of the processing channels 206. The receiver interface 205 includes a bus configured to communicate with external circuitry (e.g., the processor 122), and a bus configured to communicate with each of the processing channels 206.

Each of the processing channels 206 comprises a tuner 208, a carrier numerically controlled oscillator (NCO) 210, a decimation circuit 212, a code NCO 214, a correlator 216, a PN code generator 218, accumulation circuitry 220, correlation results memory 222, control logic 224, and channel interface logic 226. Each of the processing channels 206 may be used to process a signal from a particular satellite. The tuner 208 is driven by the carrier NCO 210 to digitally tune a particular satellite signal. The tuner 208 may serve two purposes. First, the tuner 208 may remove any intermediate frequency component remaining after processing by the front end 202. Second, the tuner 208 may compensate for any frequency shift resulting from satellite motion, user motion, and reference frequency errors. The tuner 208 outputs baseband signal data comprises an in-phase component (I) and a quadrature component (Q).

The decimation circuit 212 processes the I and Q data from the tuner 208 to produce a series of complex signal samples with I and Q components in accordance with a sampling rate determined by the code NCO 214. In general, the sampling rate of the decimation circuit 212 may be selected to produce m samples per chip of the satellite signal PN code, where m is an integer greater than zero. In this manner, the GPS receiver 104 may operate in multiple modes of resolution. For example, in a standard resolution mode, the decimation circuit 212 may produce digital signal samples have two samples per PN code chip (i.e., the samples are spaced at ½ of a PN code chip). In a high-resolution mode, the decimation circuit 212 may produce digital signal samples having five samples per PN code chip (i.e., the samples are spaced at ⅕ of a PN code chip). Those skilled in the art will appreciate that other values for the sample spacing may be employed and that the GPS receiver 104 may operate in more than two modes of resolution.

The correlator 216 processes the I and Q samples from the decimation circuit 212. The correlator 216 correlates the I and Q signals with an appropriate PN code generated by the PN code generator 218 for the particular satellite signal. The I and Q correlation results are accumulated with other I and Q correlation results by the accumulation circuitry 220 and are stored in the correlation results memory 222. The accumulation process is referred to as signal integration and is used to improve signal-to-noise ratio of the correlation results. Notably, the accumulation circuitry 220 may accumulate I and Q correlation results for a time period associated with one or more epochs of the PN code. For example, the I and Q correlation results may be accumulated over a one millisecond interval (i.e., one PN code epoch) or over a multiple millisecond interval (e.g., 10 PN code epochs or 10 milliseconds). This process is referred to as coherent integration and the associated time period is referred to as a coherent integration interval.

The coherent integration interval is limited by several factors, including uncompensated Doppler shift, 180 degree phase transitions caused by the navigation data bits, and phase shifts induced by motion of the receiver 104. These factors introduce slow, but seemingly random phase variations into the signals. Over many tens of milliseconds, these phase changes cause destructive interference that defeats the purpose of coherent integration. Thus, to achieve long averaging intervals, the accumulation circuitry 220 may perform a secondary step of magnitude accumulation (also referred to as non-coherent integration).

The carrier NCO 210, the code NCO 214, the correlator 216, and the accumulation circuitry 220 are controlled by the control logic 224. Notably, the control logic 224 may implement the desired mode of resolution (e.g., standard resolution mode or high-resolution mode) through control of the code NCO 214. The control logic 224 may receive configuration data for the processing channel $206_1$ from the channel interface 226. The channel interface 226 may receive the configuration data from the receiver interface 205. In addition, the channel interface 226 provides an interface for the processing channel $206_1$ to the correlation results memory 222. For a detailed understanding of the GPS receiver 104 and the components discussed above, the reader is referred to commonly-assigned U.S. Pat. No. 6,704,348, issued Mar. 9, 2004, which is incorporated by reference herein in its entirety.

Figure 3:
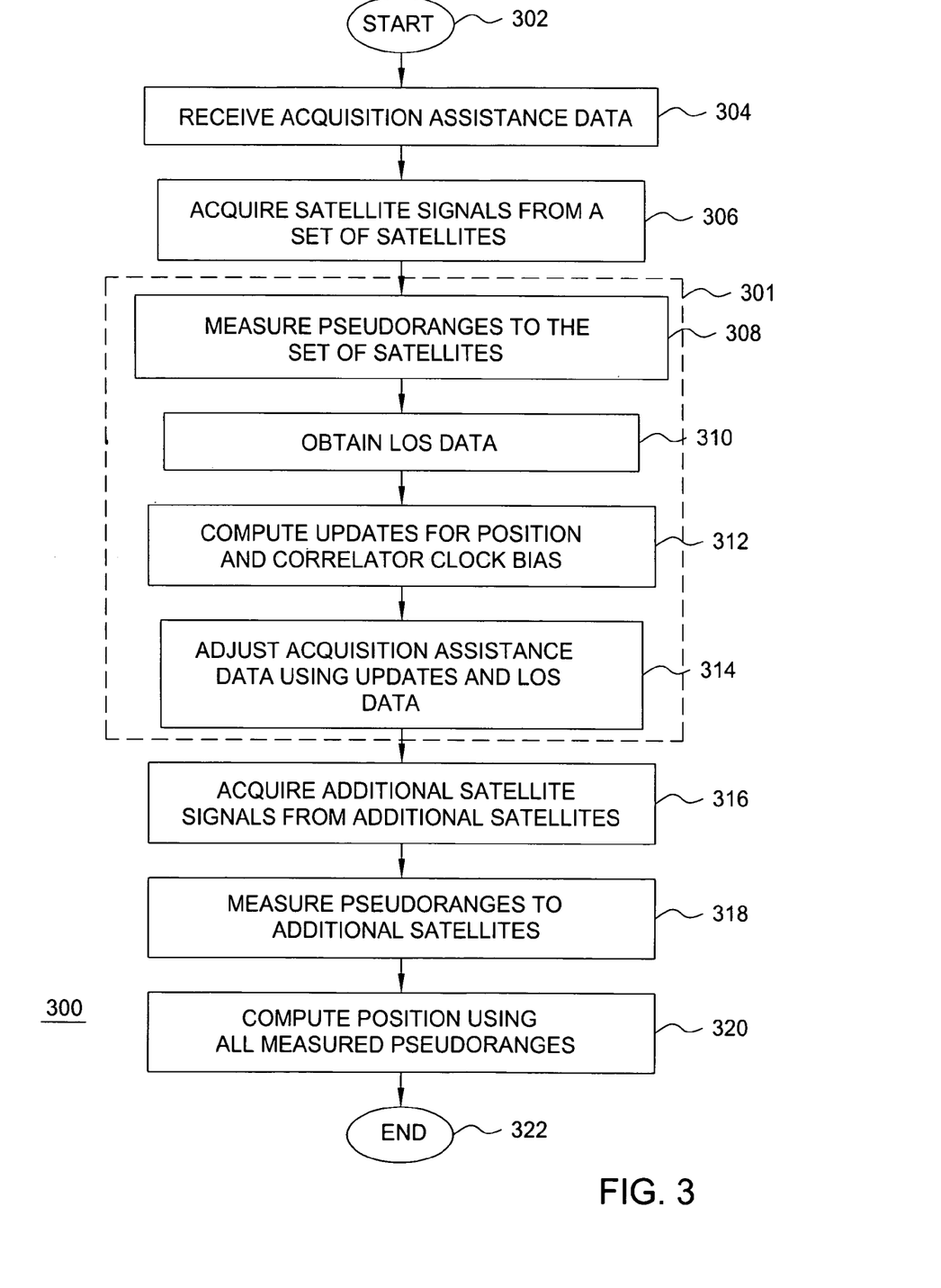
FIG. 3 is a flow diagram depicting an exemplary embodiment of a process for locating position of a mobile receiver in accordance with one or more aspects of the invention.

FIG. 3 is a flow diagram depicting an exemplary embodiment of a process 300 for locating position of a mobile receiver in accordance with one or more aspects of the invention. Aspects of the process 300 may be understood with reference to the position location system 100 shown in FIG. 1. The process 300 starts at step 302. At step 304, acquisition assistance data is received at the mobile receiver 102 from the server 108. Exemplary embodiments of acquisition assistance data are described above. At step 306, satellite signals are acquired at the mobile receiver 102 to a set of satellites. The mobile receiver 102 may use the acquisition assistance data to assistance in acquiring the satellite signals.

At step 308, pseudoranges are measured from the mobile receiver 102 to the set of satellites using the acquired signals. In one embodiment, the measured pseudoranges are sub-millisecond pseudoranges. At step 310, expected line-of-sight (LOS) data is obtained by the mobile receiver 102. The expected LOS data includes vector data from an estimated position of the mobile receiver 102 to the set of satellites acquired at step 306. In particular, the expected LOS data includes a unit vector pointing from each of the acquired satellites to the mobile receiver 102 or, equivalently, pointing from the mobile receiver to each of the acquired satellites. The LOS vectors may be defined relative to any type of coordinate system (e.g., a North, East, and Up coordinate system or a North, East, and Down coordinate system).

In one embodiment, the LOS vectors may be represented using azimuth and elevation data. For a given satellite, the projection of the LOS vector onto a horizontal coordinate plane determines an azimuth vector (e.g., a projection of the LOS vector onto a North-East plane), and the projection of the LOS vector onto a vertical axis determines an elevation vector (e.g., a projection of the LOS vector onto the Up axis). In one embodiment of the invention, the expected LOS data (e.g., azimuth and elevation data) may be derived from the acquisition assistance data received at the step 304.

The acquisition assistance data may not include expected LOS data, or may not include expected LOS data to a sufficient resolution. Whether expected LOS data is deemed to have "sufficient resolution" may be defined with respect to a threshold. For example, if expected LOS data includes azimuth and elevation information having a resolution of 0.1 degrees, then the expected LOS data may be deemed to have sufficient resolution. Those skilled in the art will appreciate that other accuracy thresholds may be defined. Accordingly, in an alternative embodiment, the expected LOS data may be computed by the mobile receiver 102 using stored satellite trajectory data (e.g., almanac data). Exemplary embodiments for computing LOS data using stored satellite trajectory data are described below.

At step 312, updates for an initial position of the mobile receiver 102 and a correlator clock bias are computed. The initial position is the estimated position of the mobile receiver 102 upon which the acquisition assistance data received at the step 304 is based. The correlator clock bias is associated with the pseudoranges measured at the step 308 (i.e., the source of the common-mode error). In one embodiment of the invention, a mathematical model may be formed that relates a residual difference between the measured pseudoranges and expected pseudoranges to updates of position and time states. Using the known residual difference data and the expected LOS data, the mobile receiver 102 may solve for one or more of the unknown state updates. The expected pseudoranges are obtained from the acquisition assistance data.

In one embodiment, the mathematical model may be defined as follows:

$$u = \begin{bmatrix} u_1 \\ \vdots \\ u_n \end{bmatrix} = \begin{bmatrix} \partial \rho_1/\partial x & \partial \rho_1/\partial y & \partial \rho_1/\partial z & \partial \rho_1/\partial t_c \\ \vdots & \vdots & \vdots & \vdots \\ \partial \rho_n/\partial x & \partial \rho_n/\partial y & \partial \rho_n/\partial z & \partial \rho_n/\partial t_c \end{bmatrix} \begin{bmatrix} x \\ y \\ z \\ t_c \end{bmatrix}$$

$$= \begin{bmatrix} \partial \rho_1/\partial x & \partial \rho_1/\partial y & \partial \rho_1/\partial z & c \\ \vdots & \vdots & \vdots & \vdots \\ \partial \rho_n/\partial x & \partial \rho_n/\partial y & \partial \rho_n/\partial z & c \end{bmatrix} \begin{bmatrix} x \\ y \\ z \\ t_c \end{bmatrix}$$

$$= Hx$$

where: $u$ is a vector of pseudorange residuals (the difference between the expected sub-millisecond pseudoranges and the actual sub-millisecond pseudoranges); and the H matrix contains the well known line-of-sight vectors (first three columns) relating the position updates (x,y,z) to the pseudorange residuals and a well known column of constants (c the speed of light) relating the correlator clock bias ($t_c$) to the pseudorange residuals. In another embodiment, other updates may be computed, such as an update for time-of-day. In addition, the mathematical model may be configured to update only latitude and longitude variables (i.e., x and y). Exemplary embodiments of the above-described mathematical model are described in commonly-assigned U.S. Pat. No. 6,417,801, issued Jul. 9, 2002, which is incorporated by reference herein in its entirety.

In some cases, the mobile receiver 102 does not have knowledge of the initial position used to form the acquisition assistance data 302. Thus, an absolute position solution for the mobile receiver 102 cannot be obtained at step 312, since the position updates are defined with respect to an unknown initial position. However, at step 314, the position updates, the correlator clock bias update, and the expected LOS data are used to adjust the acquisition assistance data received at the step 304. The expected pseudoranges or pseudorange model provided within the acquisition assistance data may be adjusted to account for the computed clock bias error and the computed position error. Notably, the correlator clock bias error adds linearly to each of the expected pseudoranges. The position error adds according to the projection of the horizontal error upon the line-of-sight to each satellite. The adjusted pseudorange model or expected pseudoranges exhibit smaller uncertainty, thereby reducing the code delay search range and frequency search range. The steps 308 through 314 comprise acquisition assistance data adjustment process 301.

At step 316, additional satellite signals are acquired from additional satellites using the adjusted acquisition assistance data. Since the adjusted acquisition assistance data exhibits less uncertainty, the satellite signals may be acquired more rapidly than at the step 306, and with more accuracy. At step 318, pseudoranges are measured from the mobile receiver 102 to the additional satellites acquired at the step 316. At step 320, position of the mobile receiver 102 is computed using all measured pseudoranges. As described above, the position may be computed by the mobile receiver 102 or the server 108. The process 300 ends at step 322.

Figure 4:
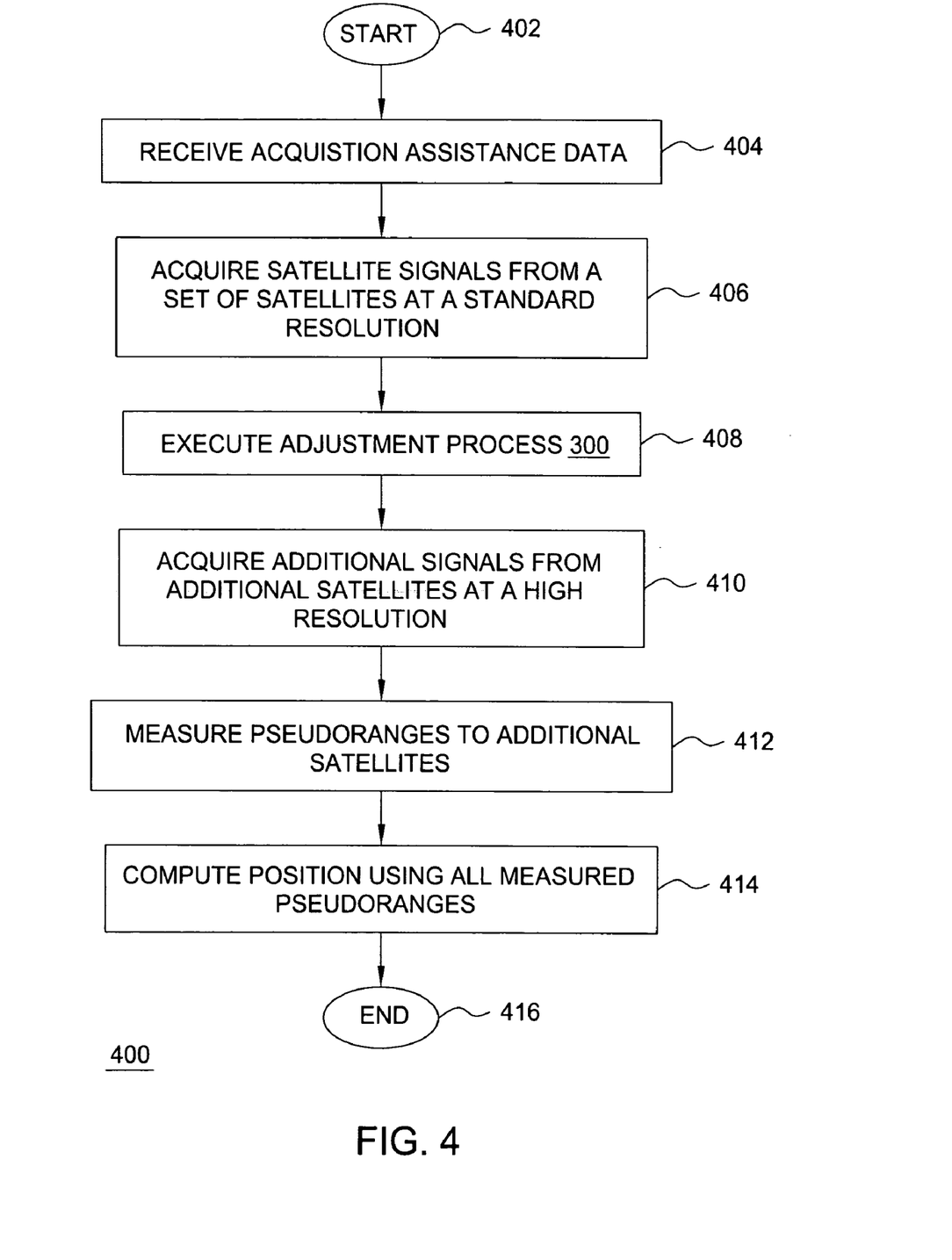
FIG. 4 is a flow diagram depicting another exemplary embodiment of a process for locating position of a mobile receiver in accordance with one or more aspects of the invention.

FIG. 4 is a flow diagram depicting another exemplary embodiment of a process 400 for locating position of a mobile receiver in accordance with one or more aspects of the invention. Aspects of the process 400 may be understood with reference to the position location system 100 shown in FIG. 1 and the GPS receiver 104 shown in FIG. 2. The process 400 starts at step 402. At step 404, acquisition assistance data is received at the mobile receiver 102 from the server 108. Exemplary embodiments of acquisition assistance data are described above. At step 406, satellite signals are acquired at the mobile receiver 102 to a set of satellites at a standard resolution. As described above, the GPS receiver 104 may be configured to operate in multiple modes of resolution. In the standard mode, the GPS receiver 104 processes the satellite signals using a wider sample spacing (e.g., two samples per PN code chip) in order to detect a correlation. The wider sample spacing may be necessary given the degree of uncertainty associated with the expected pseudoranges or pseudorange model of the acquisition assistance data.

At step 408, the acquisition assistance adjustment process 301 of FIG. 3 is performed to adjust the acquisition assistance data received at the step 404. As described above, the adjustment process 301 improves the uncertainty associated with the acquisition assistance data. At step 410, additional satellite signals are acquired from additional satellites at a high resolution. In the high resolution mode, the GPS receiver 104 processes the satellite signals using a more narrow sample spacing than in the standard resolution mode (e.g., five samples per PN code chip). The narrower sample spacing increases the sensitivity of the GPS receiver 104 when detecting correlations. The narrower sample spacing may be used, since the degree of uncertainty associated with the expected pseudoranges or pseudorange model of the acquisition assistance data has been reduced at the step 408.

At step 412, pseudoranges are measured to the additional satellites acquired at the step 410. At step 414, position of the mobile receiver 102 is computed using all measured pseudoranges. As described above, the position may be computed by the mobile receiver 102 or the server 108. The process 400 ends at step 416.

As described above, the acquisition assistance data may not include expected LOS data to a sufficient resolution. Notably, as defined in GSM 4.31, expected azimuth and elevation angles, if provided, are only known to a resolution of 11.25 degrees. Such a resolution will result in a large error in computation of the position and correlator clock bias updates described above. The effect of the 11.25 degree resolution may be measured by the change in the satellite geometry implied by rounding errors of half of 11.25 degrees. Satellite geometry is quantified by values known as DOPs (dilution of precision), which is well known in the art. A DOP value may change by an arbitrarily large amount when the constituent LOS vectors are changed by several degrees. Azimuth and elevation angles having an 11.25 degree resolution result in a large DOP value, which will produce a large position error. Thus, to improve accuracy, expected LOS data may be computed, rather than derived from the acquisition assistance data.

Figure 5:
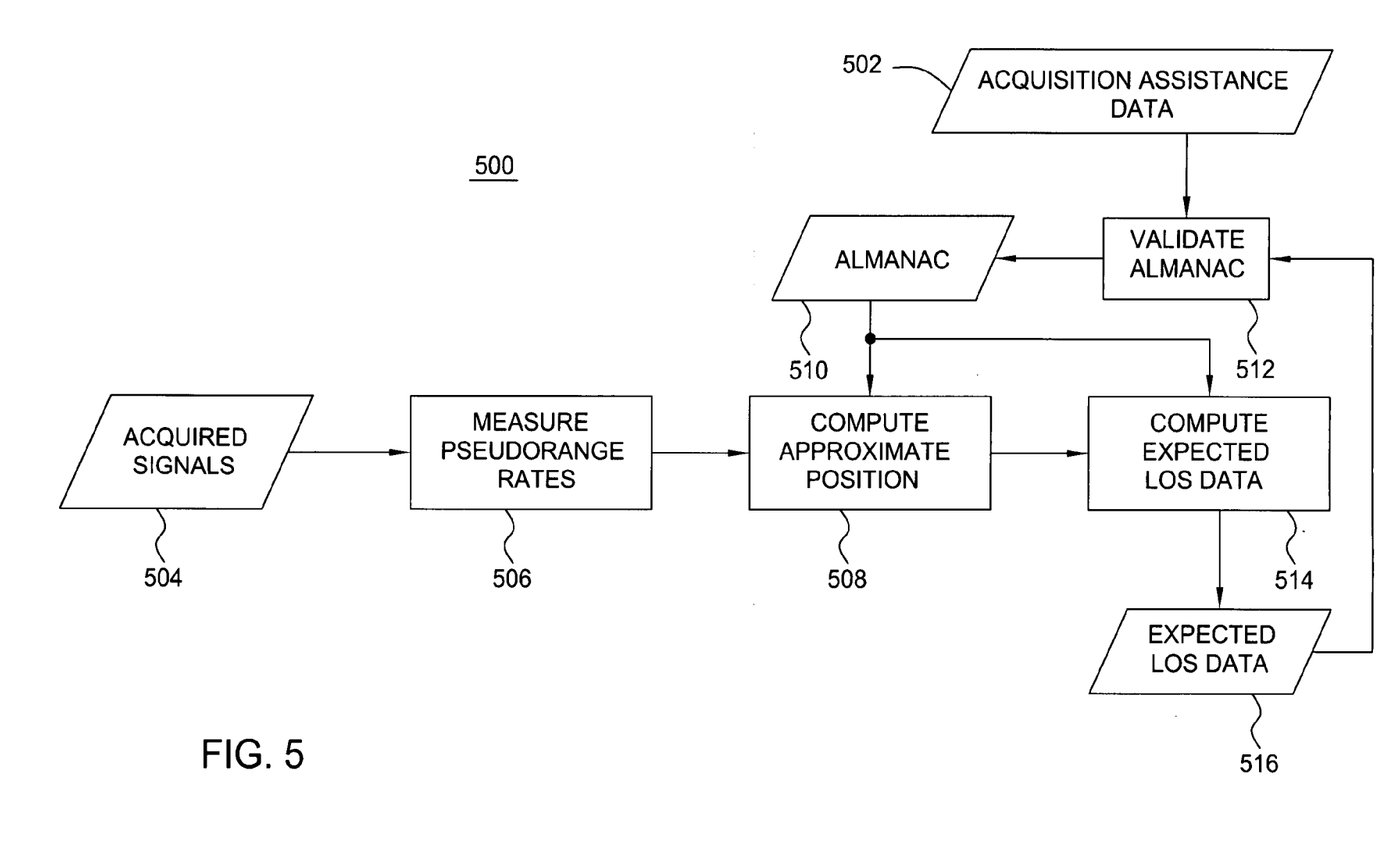
FIG. 5 is a flow diagram depicting an exemplary embodiment of a process for computing expected LOS data in accordance with one or more aspects of the invention.

FIG. 5 is a flow diagram depicting an exemplary embodiment of a process 500 for computing expected LOS data in accordance with one or more aspects of the invention. Aspects of the process 500 may be understood with reference to the position location system 100 of FIG. 1. At step 506, pseudorange rates are measured at the mobile receiver 102 using a set of acquired satellite signals 504. The pseudorange rates may be measured by computing the difference between pseudoranges measured at a first time and pseudoranges measured at a second time (i.e., the rate-of-change of the pseudoranges). Alternatively, the pseudorange rates may be measured by computing the difference between the nominal (L1) frequency of the satellite signals and the actual measured frequencies of the satellite signals.

At step 512, acquisition assistance data 502 is used to validate almanac data 510. For example, the acquisition assistance data 502 may be used to remove information from the almanac data 510 associated with satellites that may have become "unhealthy" since the almanac data 510 was generated. Notably, expected LOS data 516 computed by the process 500 may be compared with expected LOS data from the acquisition assistance data 502. Any differences exceeding a threshold may be used to provide an indication that a satellite has become unhealthy since the almanac 510 was obtained at the mobile receiver 102. Alternatively, the expected LOS data from the acquisition assistance data 502 is associated with a given set of satellites. Information in the almanac 510 that pertains to satellites other than the satellites identified in the acquisition assistance data may be removed or not used.

At step 508, the almanac data 510 and the pseudorange rates computed at step 506 are used to compute an approximate position of the mobile receiver 102. In one embodiment, this may be done iteratively applying the following mathematical model:

$$\underline{u} = \begin{bmatrix} u_1 \\ \vdots \\ u_n \end{bmatrix} = \begin{bmatrix} \partial \dot{p}_1/\partial x & \partial \dot{p}_1/\partial y & \partial \dot{p}_1/\partial z & c \\ \vdots & \vdots & \vdots & \vdots \\ \partial \dot{p}_n/\partial x & \partial \dot{p}_n/\partial y & \partial \dot{p}_n/\partial y & c \end{bmatrix} \begin{bmatrix} x \\ y \\ z \\ f_c \end{bmatrix}$$

where $\underline{u}$ is the vector of pseudorange rate residuals (i.e., the difference between the measured and expected pseudorange rates), $\partial$ denotes a partial derivative, $\dot{\rho}_n$ is the nth pseudorange rate, and c denotes the speed of light. The variables x,y, and z are the updates to the a-priori position. In one embodiment, there is no provided initial position, thus the above model may be applied with an initial position at the center of the earth and iterated until the updates converge. The variable $f_c$ is the update to the a-priori reference frequency offset in the mobile receiver 102. In one embodiment, the units of $f_c$ are seconds/second, the units of c are m/s, and the units of $\underline{u}$ are m/s. The derivation of this model is described in more detail in commonly-assigned U.S. patent application Ser. No. 10/617,559, filed Jul. 11, 2003, which is incorporated by reference herein in its entirety. Further terms, such as time-of-day offset, may be included in the above-described computation, but since only an approximate position is required (e.g. to within 10 km), it is sufficient to use approximate time-of-day in the above calculation when computing the values of $\underline{u}$ and the entries in the matrix.

The expected pseudorange rates and the matrix entries may be computed using the almanac. This leads to some errors, since the almanac is an imprecise model of the satellite orbits, but these errors are small enough to give a position within 10 km, which is sufficient to compute accurate line-of-sight vectors. Using this approach, an approximate position may be computed to within approximately 10 km of the actual position of the mobile receiver 102. At step 514, expected LOS data 516 may be computed using the approximate position and the almanac data 510.

Figure 6:
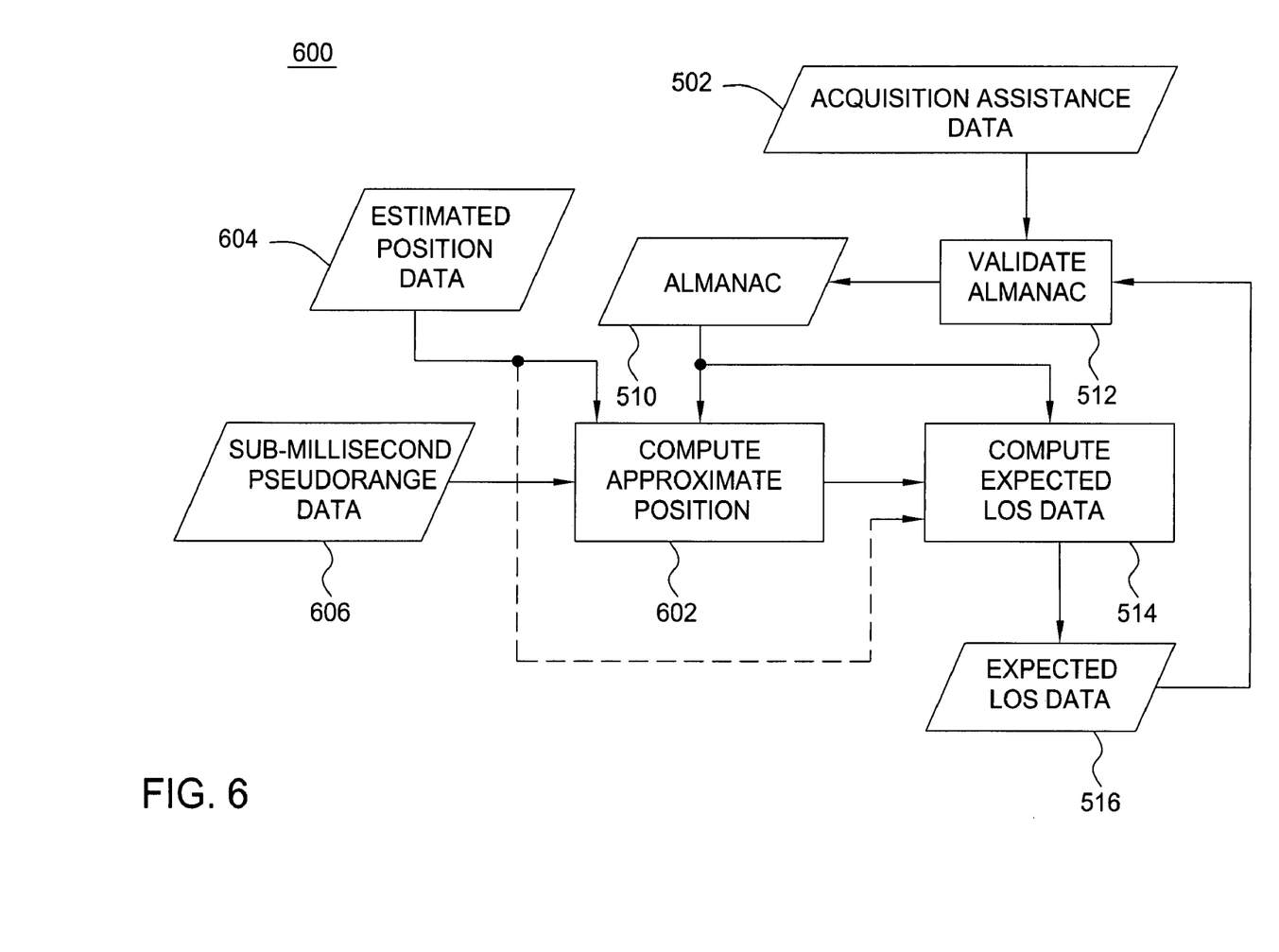
FIG. 6 is a flow diagram depicting another exemplary embodiment of a process for computing expected LOS data in accordance with one or more aspects of the invention.

FIG. 6 is a flow diagram depicting another exemplary embodiment of a process 600 for computing expected LOS data in accordance with one or more aspects of the invention. Elements of FIG. 6 that are the same or similar to those of FIG. 5 are designated with identical reference numerals and are described in detail above. In addition, aspects of the process 600 may be understood with reference to the position location system 100 of FIG. 1.

In the present embodiment, the mobile receiver 102 may compute expected LOS data using the almanac data 510, and estimated position data 604. For example, the estimated position data 604 may include an estimated position of the mobile receiver 102 to within 150 km of the true position. The mobile receiver 102 may obtain the estimated position data 604 from the server 108, from a recent position-fix, or using other various position estimation techniques known in the art. At step 602, the almanac data 510, the estimated position data 604, and sub-millisecond pseudorange data 606 are used to compute an approximate position of the mobile receiver 102. The estimated position data 604 may be used to fix the integer portion of the sub-millisecond pseudoranges, and an approximate position may be computed using the almanac in a well-known manner. For example, an approximate position may be computed to within 10 km of the actual position of the mobile receiver 102. The approximate position computed at step 602 may be used in step 514 to compute expected LOS data, as described above. Alternatively, if the estimated position data 604 is known to better accuracy (for example 10 km accuracy), then the expected LOS data may be computed directly from the estimated position data 604 without the intermediate step of computing an approximate position at step 602 using the almanac.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system.

While the foregoing is directed to illustrative embodiments of the present invention, other and further embodiments of the invention may be devised without departing from the basic scope thereof, and the scope thereof is determined by the claims that follow.

What is claimed is:

1. A method of adjusting acquisition assistance data received by a mobile receiver from a server, comprising:
    measuring pseudoranges from said mobile receiver to a set of satellites;
    obtaining line-of-sight data with respect to said mobile receiver and said set of satellites;
    processing said pseudoranges and said line-of-sight data to compute updates for an initial position associated with said acquisition assistance data and correlator clock bias associated with said pseudoranges; and
    adjusting said acquisition data using said updates and said line-of-sight data.

2. The method of claim 1, further comprising:
    measuring at least one additional pseudorange from said mobile receiver to at least one additional satellite using said adjusted acquisition assistance data.

3. The method of claim 2, further comprising:
computing position of said mobile receiver using said pseudoranges and said at least one additional pseudorange.

4. The method of claim 3, further comprising:
sending said pseudoranges and said at least one additional pseudorange to said server;
wherein said position is computed by said server.

5. The method of claim 3, wherein said position is computed by said mobile receiver.

6. The method of claim 2, wherein said step of measuring pseudoranges comprises processing satellite signals received from said set of satellites using a first sample spacing, and wherein said step of measuring at least one additional pseudorange comprises processing a satellite signal from each said at least one additional satellite using a second sample spacing.

7. The method of claim 6, wherein said second sample spacing is less than said first sample spacing.

8. The method of claim 1, wherein said acquisition assistance data comprises expected pseudoranges computing using said initial position.

9. The method of claim 1, wherein said acquisition assistance data comprises a pseudorange model computed using said initial position.

10. The method of claim 1, wherein said line-of-sight data is obtained from said acquisition assistance data.

11. The method of claim 10, wherein said line-of-sight data comprises azimuth data and elevation data.

12. The method of claim 1, further comprising:
measuring pseudorange rates at said mobile receiver;
obtaining almanac data; and
computing an approximate position of said mobile receiver using said pseudorange rates and said almanac data;
wherein said step of obtaining line-of-sight data comprises computing said line-of-sight data using said approximate position and said almanac data.

13. The method of claim 1, further comprising:
obtaining almanac data; and
obtaining an approximate position of said mobile receiver;
wherein said step of obtaining line-of-sight data comprises computing said line-of-sight data using said approximate position and said almanac data.

14. The method of claim 1, wherein said step of processing comprises:
obtaining expected pseudoranges from said acquisition assistance data; and
forming a mathematical model relating said pseudoranges, said expected pseudoranges, and said line-of-sight data to said updates.

15. A mobile receiver, comprising:
a wireless transceiver for receiving acquisition assistance data from a server;
a satellite signal receiver for measuring pseudoranges from said mobile receiver to a set of satellites; and
a processor for obtaining line-of-sight data with respect to said mobile receiver and said set of satellites, processing said pseudoranges and said line-of-sight data to compute updates for an initial position associated with said acquisition assistance data and correlator clock bias associated with said satellite signal receiver, adjusting said acquisition data using said updates and said line-of-sight data.

16. The mobile receiver of claim 15, wherein said satellite signal receiver is further configured to measure at least one additional pseudorange from said mobile receiver to at least one additional satellite using said adjusted acquisition assistance data.

17. The mobile receiver of claim 16, wherein said processor is further configured to compute position of said mobile receiver using said pseudoranges and said at least one additional pseudorange.

18. The mobile receiver of claim 16, wherein said wireless transceiver is configured to transmit said pseudoranges and said at least one additional pseudorange to said server.

19. The mobile receiver of claim 16, wherein said satellite signal receiver is configured to sample satellite signals at multiple sample spacings, wherein said pseudoranges are measured using a first sample spacing, and wherein said at least one additional pseudorange is measured at a second sample spacing.

20. The mobile receiver of claim 19, wherein said second sample spacing is less than said first sample spacing.

21. The mobile receiver of claim 15, wherein said processor is configured to obtain said line-of-sight data from said acquisition assistance data.

22. The mobile receiver of claim 21, wherein said line-of-sight data comprises azimuth data and elevation data.

23. The mobile receiver of claim 15, wherein said processor is configured to compute said line-of-sight data using almanac data.

24. Apparatus for adjusting acquisition assistance data received by a mobile receiver from a server, comprising:
means for measuring pseudoranges from said mobile receiver to a set of satellites;
means for obtaining line-of-sight data with respect to said mobile receiver and said set of satellites;
means for processing said pseudoranges and said line-of-sight data to compute updates for an initial position associated with said acquisition assistance data and correlator clock bias associated with said pseudoranges; and
means for adjusting said acquisition data using said updates and said line-of-sight data.

* * * * *